United States Patent [19]
Takagi et al.

[11] Patent Number: 5,254,922
[45] Date of Patent: Oct. 19, 1993

[54] ROTATIONAL POSITION DETECTOR FOR ROBOT

[75] Inventors: Noboru Takagi; Mitsuyoshi Obata, both of Kobe, Japan

[73] Assignee: Kabushiki Kaisha Kobe Seiko Sho, Kobe, Japan

[21] Appl. No.: 842,970

[22] Filed: Feb. 28, 1992

[30] Foreign Application Priority Data

Mar. 22, 1991 [JP] Japan .................. 3-58908

[51] Int. Cl.$^5$ .................. B25J 19/02; G05B 1/06
[52] U.S. Cl. .................. 318/568.11; 318/661; 318/592; 318/602
[58] Field of Search .................. 318/560-636, 318/661-663; 364/474.01-474.29; 395/80-89; 901/3, 5, 7, 9, 12, 15

[56] References Cited

U.S. PATENT DOCUMENTS

| | | | |
|---|---|---|---|
| 3,160,803 | 12/1964 | White | 318/28 |
| 4,207,504 | 6/1980 | Kawada et al. | 318/561 |
| 4,342,950 | 8/1982 | Kohzai et al. | 318/611 |
| 4,345,192 | 8/1982 | Kohzai et al. | 318/592 |
| 4,359,676 | 11/1982 | Fujioka | 318/653 |
| 4,450,393 | 5/1984 | Kohzai et al. | 318/592 |
| 4,501,999 | 2/1985 | Kohzai et al. | 318/632 |
| 4,575,666 | 3/1986 | Nakashima et al. | 318/661 |
| 4,621,332 | 11/1986 | Sugimoto et al. | 318/568 |
| 4,647,827 | 3/1987 | Toyoda et al. | 318/592 |
| 4,827,203 | 5/1989 | Sakano | 318/601 X |
| 4,914,364 | 4/1990 | Hirai | 318/590 |
| 5,093,610 | 3/1992 | Bailey | 318/661 |

FOREIGN PATENT DOCUMENTS

| | | |
|---|---|---|
| 3429648 | 2/1986 | Fed. Rep. of Germany . |
| 3720828 | 1/1989 | Fed. Rep. of Germany . |
| 3837526 | 12/1989 | Fed. Rep. of Germany . |
| 51-53846 | 5/1976 | Japan . |
| 53-6061 | 1/1978 | Japan . |
| 54-114685 | 9/1979 | Japan . |

*Primary Examiner*—Paul Ip
*Attorney, Agent, or Firm*—Oblon, Spivak, McClelland, Maier & Neustadt

[57] ABSTRACT

Disclosed is herein a rotational position detector for a robot which can always accurately detect the rotational positions of each rotational member based on the output values from each absolute value detector regardless of the rotational conditions of the rotational member. Each absolute value detector (resolver) is connected to each rotational member such that the ratio of the rotational angle period of the absolute value detector to the rotational angle period of the rotational member is set to be 1:N (N is an integer larger than 1).

3 Claims, 3 Drawing Sheets

ROTATIONAL POSITION DETECTOR FOR ROBOT

BACKGROUND OF THE INVENTION

1. Field of the Invention

The present invention relates to a rotational position detector for a robot, and particularly, to a rotational position detector for detecting the rotational positions of each arm or a wrist member of the robot which is capable of multiple rotations around the same axis.

2. Description of the Prior Art

The conventional detector has such a construction as shown in FIG. 3, wherein a motor 3 rotating a wrist 2 through a reduction gear 1 is connected to a resolver 5 through a reduction gear 4.

As the resolver 5, there is used a so-called absolute value detector for outputting the magnitude of a rotational angle in terms of an absolute value signal by each rotation of a detection shaft.

The motor 3 is mounted with another resolver 6 (so-called precise resolver) for precisely detecting the rotational positions of the output shaft of the motor 3.

When the wrist 2 is rotated by the motor 3, the rotational position of the wrist 2 is detected based on an output signal from the resolver 5.

In the aforesaid conventional detector, even when the resolver 5 is rotated by a large number of times, the rotational positions can be continuously detected by counting the rotational number of the resolver 5 or the like. However, for example, when the power is turned off once due to a trouble and is turned on again, there occurs one cannot correctly detect the position of the wrist 2 according to an output signal from the resolver 5.

This is because of the fact that, as shown in FIG. 4, for the same signal values from the resolver 5 to the wrist 2 is capable of multiple, the rotational positions which differ from each other, shown, as the points A, B and C, depending on the total angle of the wrist 2. Therefore, the rotational angle of the wrist 2 must be limited so that the rotation of the resolver 5 can be kept within one turn for realizing an absolute position detection mechanism in the aforesaid detector.

SUMMARY OF THE INVENTION

It is therefore an object of the present invention to provide a rotational position detector for a robot which can always accurately detect the rotational positions of each rotational member based on the output values from each absolute value detector regardless of the rotational conditions of the rotational member.

To achieve the aforesaid object, according to the present invention, there is provided a rotational position detector for a robot which detects rotational positions of each rotational member capable of multiple rotations around the same axis by each absolute value detector, wherein the absolute value detector is connected to the rotational member such that the ratio of the rotational angle period of the absolute value detector to the rotational angle period of the rotational member is set to be 1:N (N is an integer larger than 1).

In the present rotational position detector having the aforesaid construction, when the rotational positions are identical to each other in each rotational member rotated by a large number of times, the signal values outputted from each absolute value detector in compliance with the rotational positions are always identical to each other.

In other words, the absolute positions of each rotational member are always accurately detected based on the output signal values from each absolute value detector regardless of the rotational conditions of the rotational member.

DETAILED DESCRIPTION OF THE PREFERRED EMBODIMENTS

The exemplary embodiment according to the present invention will be described in detail with reference to the drawings.

The present rotational position detector is nearly similar to the conventional one in the essential construction, except that each resolver is connected to each arm or a wrist member such that the ratio of the rotation angle period of the resolver (so-called absolute value detector) to the rotational angle period of each arm or the wrist member is set to be 1:N (N is an integer larger than 1 and is selected at 3 in the present embodiment).

Figure 1:
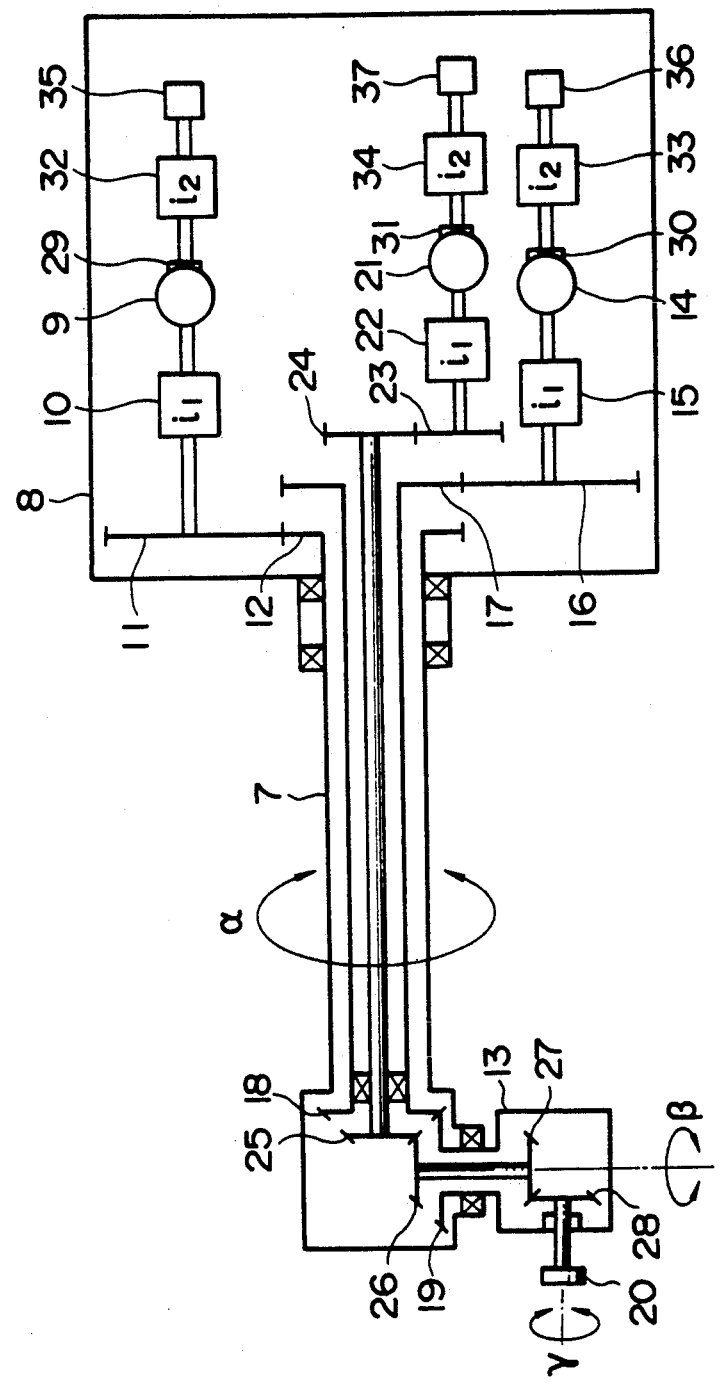
FIG. 1 is a construction view showing the major portion of a robot including a rotational position detector according to an embodiment of the present invention.

FIG. 1 is a construction view of a robot including the rotational position detector, wherein a cylindrical first arm 7 is supported by a base 8 so as to be rotatable around an axis $\alpha$, and which is rotated by a servomotor 9 disposed on the base 8 through a reduction gear 10, and gears 11 and 12. In this case, the gear 11 is identical to the gear 12 in the number of teeth.

A cylindrical second arm 13 is supported by the first arm 7 so as to be rotatable around an axis $\beta$ crossing the axis $\alpha$, and which is rotated by a servomotor 14 disposed on the base 8, through a reduction gear 15, gears 16 and 17, and bevel gears 18 and 19. In this case, the same number of teeth is selected between the gears 16 and 17, and between the bevel gears 18 and 19, respectively.

A wrist member 20 is supported on the extreme end portion of the second arm 13 so as to be rotatable around an axis $\gamma$ crossing the axis $\beta$ of the second arm 13, and which is rotated by a servomotor 21 disposed on the base 8, through a reduction gear 22, gears 23 and 24, and bevel gears 25, 26, 27 and 28. In this case, the same number of teeth is selected between the gears 23 and 24, between the bevel gears 25 and 26, and between the bevel gears 27 and 28, respectively.

The servomotors 9, 14 and 21 are provided with respective resolvers 29, 30 and 31 for precisely detecting the rotational positions of respective output shafts of the servomotors 9, 14 and 21. Moreover, the servomotors 9, 14 and 21 are connected through reduction gears 32, 33 and 34 to resolvers 35, 36 and 37 (so-called absolute value detectors) for detecting the rotational absolute positions of the first arm 7, the second arm 13 and the wrist member 20.

In the present embodiment, respective reduction ratios of the reduction gears 10, 15 and 22 are set to be $1/i_1$, respective reduction ratios of reduction gears 32, 33 and 34 are set to be $1/i_2$, and $i_2/i_1$ is set to be N.

In the aforesaid embodiment, therefore, the ratio of the rotational angle periods of the resolvers 35, 36 and 37 to the rotational angle periods of the first arm 7, the second arm 13 and the wrist member 20 becomes 1: e.g., 1:4 where $i_2/i_1=3$. This is shown in FIG. 2.

Figure 2:
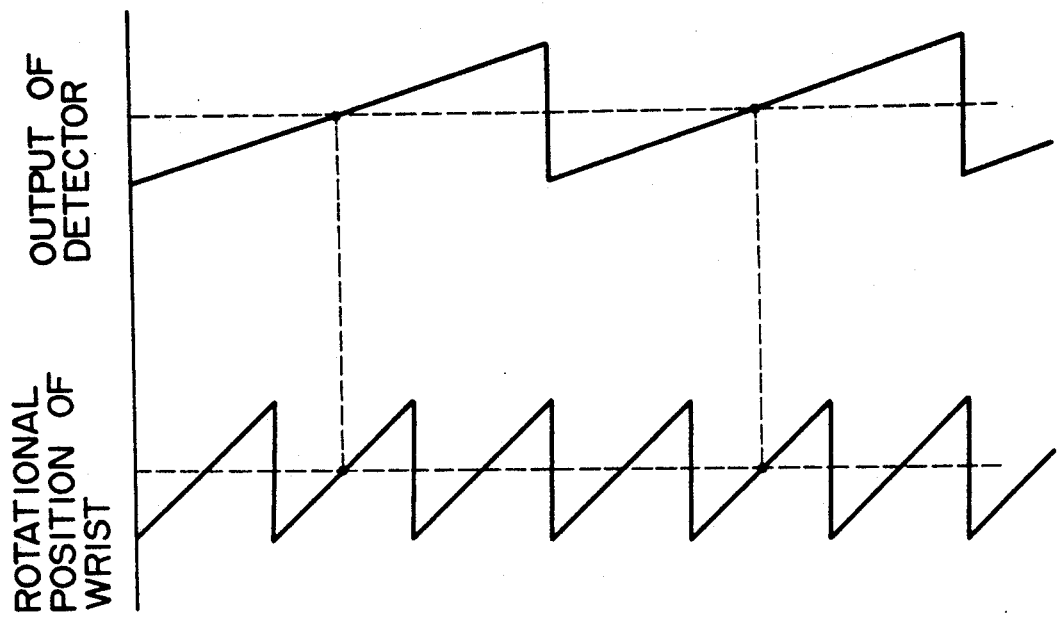
FIG. 2 is a graph showing the relation between an output signal value from an resolver (absolute value detector) constituting the rotational position detector shown in FIG. 1, and a rotational position of a wrist member.
Figure 3:
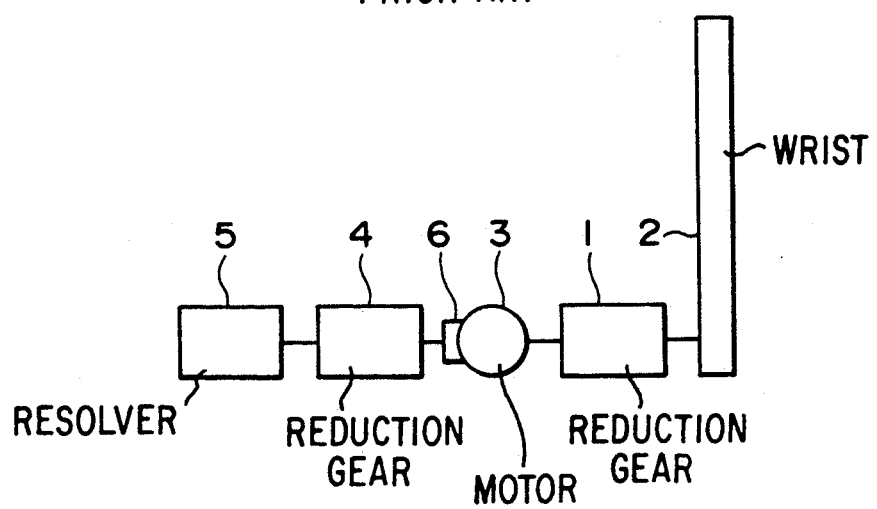
FIG. 3 is a schematic view of showing the outline of the major portion of a robot for explaining the background technology of the present invention.
Figure 4:
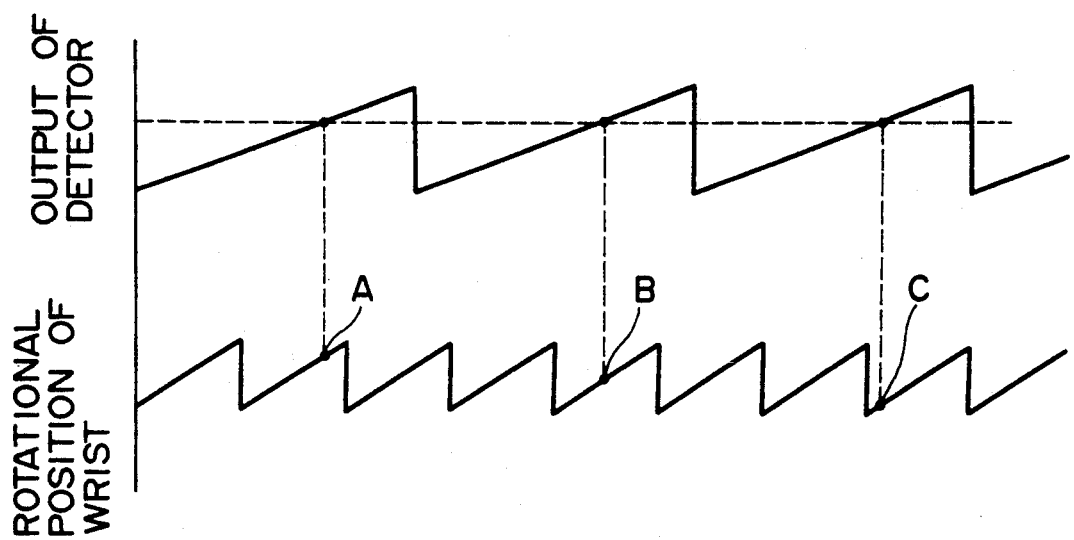
FIG. 4 is a graph for a conventional rotational position detector, showing the relation between an output signal value from an absolute value detector and a rotational position of a wrist member.

Accordingly, for example, in the relation between the resolver 37 and the wrist member 20 shown in FIG. 2 N, e.g., 1:4 where $i_2/i_1=3$. This is shown in FIG. 2. if the output, signal values from the resolver 37 are integral multiples of the rotational position of the wrist member 20, to absolute rotational positions of the wrist member 20 corresponding to the output signals are always accurately shown at an identical dash lines regardless of the total rotational angle of the wrist member.

In this case, it is possible to detect the rotational position of the wrist member 20 prior to its positioning at an absolute position by detecting the rotational number of the resolver 37. Thus, referring to FIG. 2, the wrist member will always be at a given position shown by dash lines when the output of the detector has a given value shown by dash lines, regardless of the total number of turns of the wrist member.

The relation between the resolver 37 and the wrist member 20 as described in the above can be applied to the relation between the resolver 35 and the first arm 7, and also to the relation between the resolver 36 and the second arm 13.

In the present embodiment, therefore, even in a case where the power is turned off due to trouble and later it is turned on again, the absolute positions of the first arm 7, the second arm 13 or the wrist member 20 can be always accurately detected based on respective output signal values from the resolver 35, 36 or 37.

It is to be understood that the invention is not limited to the specific embodiment thereof except as defined in the appended claim.

What is claimed is:

1. A rotational position detector for detection rotation of coaxial rotational numbers of a robot, comprising:

rotational members, each being capable of multiple rotations about the same axis; and absolute value detectors for detecting rotational positions of each of said rotational members about said axis, wherein each of said absolute value detectors is connected to a corresponding one of said rotational members, and wherein a ratio of a rotational angle period of said absolute value detector to a rotational angle period of said rotational member is 1:N, where N is an integer larger than 1.

2. A robot comprising:

coaxial rotational members, each being capable of multiple rotations about the same axis; and absolute value detectors for detecting rotational positions of each of said rotational members about said axis, wherein each of said absolute value detectors is connected to a corresponding one of said rotational members, and wherein a ratio of a rotational angle period of said absolute value detector to a rotational angle period of said rotational member is 1:N, where N is an integer larger than 1.

3. A robot having a rotational position detector and comprising:

rotational members, each being capable of multiple rotations; and absolute value detectors for detecting rotational positions of each of said rotational members, wherein each of said absolute value detectors is connected to a corresponding one of said rotational members, and wherein a ratio of a rotational angle period of said absolute value detector to a rotational angle period of said rotational member is limited to only a value of 1:N, where N is an integer larger than 1.

* * * * *